United States Patent [19]

Tanaka et al.

[11] 4,159,488
[45] Jun. 26, 1979

[54] VARIABLE SPEED FACSIMILE TRANSMITTER USING STORAGE MODE PHOTODETECTION ARRAY

[75] Inventors: Yutaka Tanaka, Kadoma; Takeshi Kubota; Setsuro Hashimoto, both of Tokyo, all of Japan

[73] Assignees: Matsushita Electric Ind. Co., Ltd.; Matsushita Graphic Communication Systems, both of Japan

[21] Appl. No.: 877,795

[22] Filed: Feb. 13, 1978

Related U.S. Application Data

[63] Continuation-in-part of Ser. No. 876,120, Feb. 7, 1978, abandoned.

[30] Foreign Application Priority Data

Feb. 7, 1977 [JP] Japan .................................. 52/12729

[51] Int. Cl.² ........................................... H04N 3/14
[52] U.S. Cl. ................................. 358/213; 250/211 J
[58] Field of Search .............. 358/211, 212, 213, 294; 250/211 R, 211 J, 578; 307/311

[56] References Cited

U.S. PATENT DOCUMENTS

| 3,715,485 | 2/1973 | Weimer | 250/578 |
| 3,846,028 | 11/1974 | List | 250/211 R |
| 3,872,245 | 3/1975 | Sagawa et al. | 358/213 |

Primary Examiner—Robert L. Griffin
Assistant Examiner—Joseph A. Orsino, Jr.
Attorney, Agent, or Firm—Lowe, King, Price & Becker

[57] ABSTRACT

In a variable speed facsimile transmitter employing a storage mode photodetection array as a line scanner, the array is driven at one of a plurality of selectable clock rates so as to generate a video line signal in response to each clock pulse. The photodetection array is discharged at an instant delayed from the occurrence of the clock pulse by an interval determined by the difference between the selected clock rate and the highest clock rate to discard the video signal available at that instant and then allowed to develop charge during the rest of the interval between clock pulses, whereby a constant magnitude video line signal is derived at the occurrence of each clock pulse regardless of the selected clock rate.

12 Claims, 2 Drawing Figures

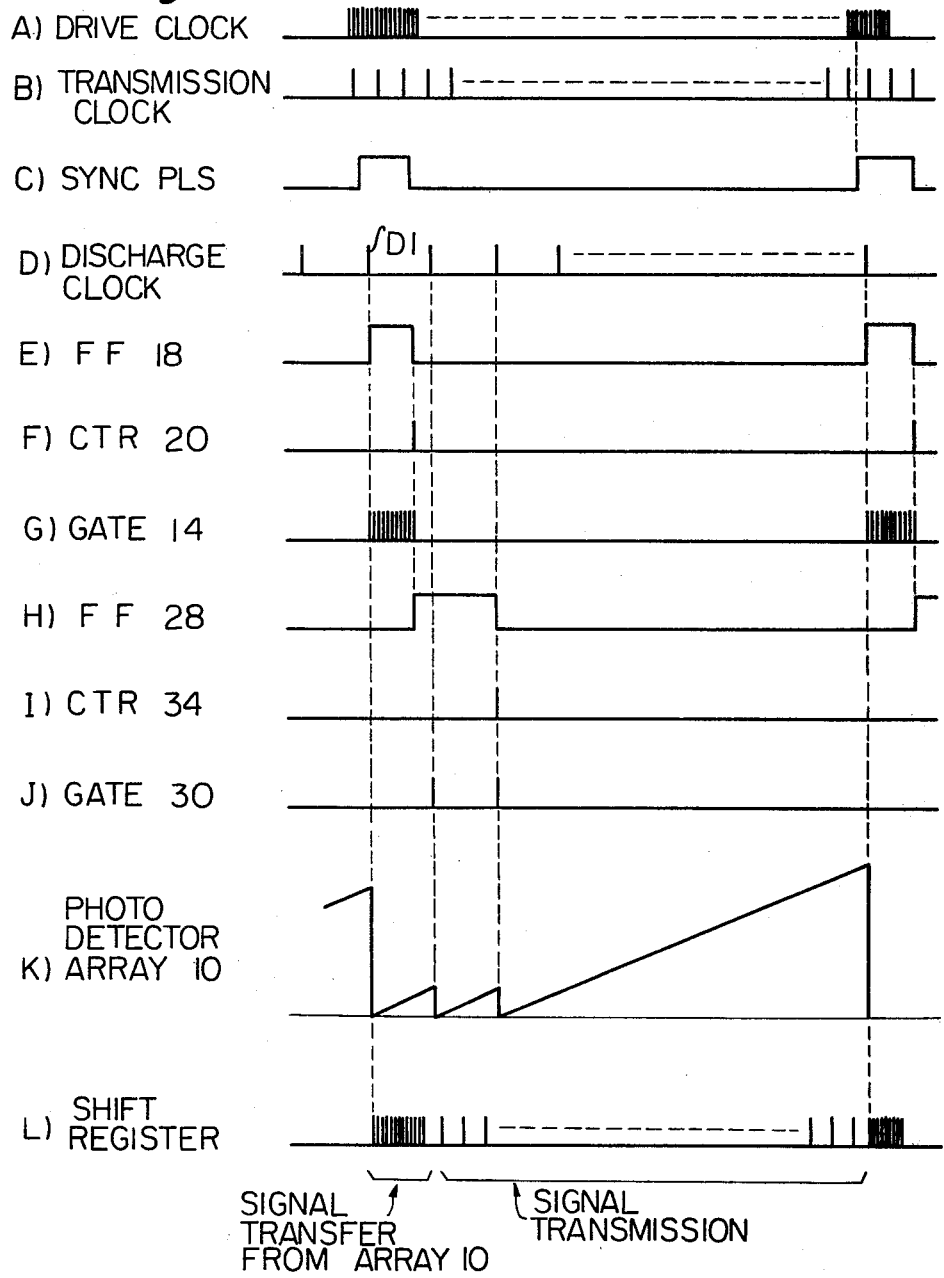

VARIABLE SPEED FACSIMILE TRANSMITTER USING STORAGE MODE PHOTODETECTION ARRAY

CROSS-REFERENCE TO RELATED APPLICATIONS

This is a continuation-in-part of our parent application Ser. No. 876,120, filed Feb. 7, 1978 now abandoned.

BACKGROUND OF THE INVENTION

The present invention relates to facsimile communication and more specifically to a variable speed facsimile transmitter which employs a storage mode photodetection array as a means of deriving a video line signal and method of operating the facsimile transmitter employing such photodetection arrays.

The present invention incorporates self-scanning photodetection arrays as a means of sensing visual information recorded on a printed document to be transmitted over long distances. The photodetection arrays utilize solid state photosensitive devices which operate in a storage mode. These devices, when operated in the storage mode with a junction reverse biased, have the characteristics of a capacitor. When the junction is open circuited the junction slowly discharges as electrons and holes are generated thermally and neutralize the stored charge on each side of the junction. With the application of light to the junction the discharge of the junction occurs much more rapidly and hence the junction may be used to sense light. Typically, the junction is recharged periodically and the recharging current is sensed; this current is a function of the total incident light on the junction, i.e. the time integral of the incident light. In many pattern recognition applications which utilize an array of photodiodes in a storage mode of operation, an elongated row of the photosensitive device is scanned electrically. Typically, the electrical circuit utilized to scan the photosensitive devices is incorporated on the same semiconductor substrate or chip as the photosensitive devices. The photodetection array incorporated in the present invention is commercially available from Reticon Corporation, U.S.A.

Because of the storage mode of operation with the magnitude of the available output varying as a function of the time integral of the quantity of incident light, and because of the possible difference between the scanning speed of the photosensitive device and the speed at which an electronic circuit processes the video signal into a format suitable for transmission, it is necessary to drive the photosensitive device such that a same line path of a printed document is scanned repeatedly until the processor is ready to process the output of the photosensitive device. Otherwise, the photosensitive device would reach the saturation level upon prolonged exposure to the sensed line. This requires that the photosensitive device be repeatedly discharged at intervals.

In practice, facsimile communication sytems are designed to operate on a number of transmission speeds to meet the user's requirements. Where the aforesaid photodetection array is employed as a means of scanning documents, the amplitude of the scanner output will vary depending on the transmission speed.

To keep the video output constant over the differing transmission speeds, the prior art system, disclosed in Japanese Patent Application No. 51-105221, laid open to public inspection on Sept. 17, 1976, discharges the photodetection array at a constant frequency which is a common multiple of the different scanning frequencies of the system. For example, assume the system have 3 Hz and 5 Hz scanning frequencies, the photodetector is discharged always at 15 Hz, regardless of the selected scanning frequency.

However, since the amplitude of the photodetector output decreases inversely with the discharge frequency, the video output of the prior art system is of small amplitude, which would require amplification of the signal or high performance optical system to reduce the loss of incident light.

SUMMARY OF THE INVENTION

In a facsimile transmitter which employs a storage mode photodetection array and drives it at one of a plurality of manually selectable clock rates, the present invention contemplates to discharge the photodetection array at an instant of time which is delayed from the time of occurrence of the clock pulse by an interval responsive to the difference between the selected clock rate and the highest clock rate of the system so that the video signal available at that instant is discarded. Upon the discharge of the photodetection array, the array is allowed to develop charges for a constant time interval until the occurrence of a subsequent clock pulse, whereupon the array is energized to generate a video line signal having a constant amplitude regardless of the selected clock rate. Specifically, the interval is determined by counting a unit time period which is equal to the reciprocal of a common multiple of the selectable clock rates, and the discharge is effected when the count reaches a number determined by the difference between the selected clock rate and the highest clock rate.

It is an object of the invention to generate a video line signal of constant signal level from a storage mode photodetection array driven at variable clock rates regardless of the selected clock rate.

BRIEF DESCRIPTION OF THE DRAWINGS

The invention will be further described with reference to the accompanying drawings, in which:

FIG. 2 is a timing diagram useful for describing the operation of FIG. 1.

DETAILED DESCRIPTION

Figure 1:
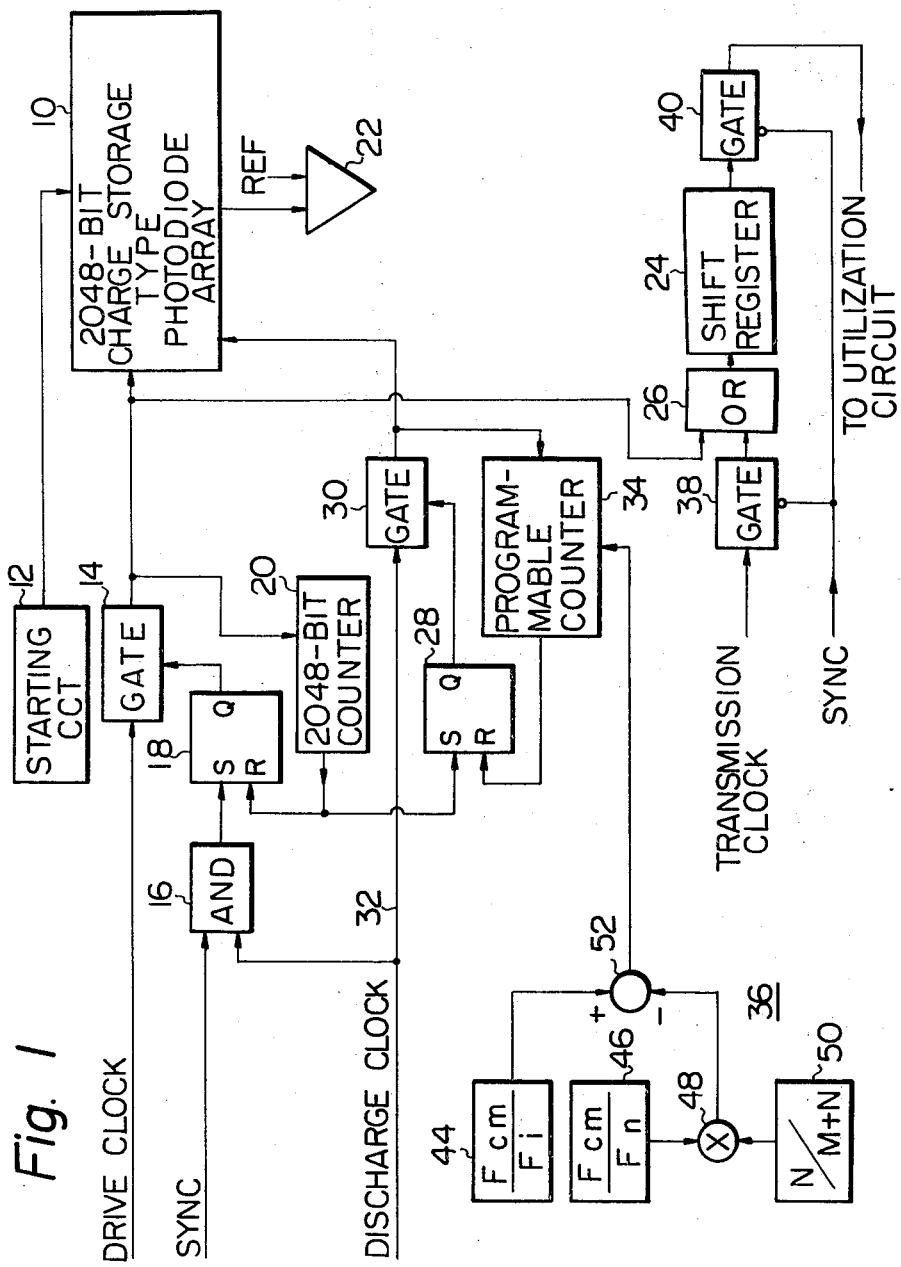
FIG. 1 is a schematic block diagram of an embodiment of the invention.

The facsimile transmitter of the present invention represented in FIG. 1 of the drawings includes a 2,048-bit storage mode photodiode array or detector 10 which is shown connected to a starting circuit 12 which energizes the detector to receive drive pulses from a source (not shown) of drive clock (FIG. 2A) through a gate 14. The rate of this clock is so selected that the photodetector 10 completes its delivery of a line video output within the period of a synchronization pulse (FIG. 2C) which appears at the start of each line scan. The sync pulse is applied to an AND gate 16 to enable it to pass a discharge clock pulse (FIG. 2D) used to discharge the photodiode array to reset it to the initial charge level. A 2,048-bit counter 20 is shown connected to the output of the gate 14 to count the number of clock pulses supplied to the photodetector 10. Therefore, the flip-flop 18 will be reset in response to a pulse count of 2,048 bits by the output of the counter 20 to terminate the supply of clock pulses to the photodetector 10 (FIGS. 2E, 2F and 2G).

A video output is thus delivered from the photodetector 10 and supplied to a first input of a comparator 22 for comparison with a reference voltage to eliminate any ambiguous level signal components so that the comparator output is a clear-cut, black-and-white signal. This signal is clocked into a shift register 24 by the clock pulses passed through gate 14 and an OR gate 26.

A flip-flop 28 is shown connected to the output of counter 20 which triggers flip-flop 28 into a set condition upon the count of 2,048 pulses of drive clock. A gate 30 is shown connected to the Q output of the flip-flop 28 to pass discharge clock pulses on lead 32 to the photodetector 10 in the presence of the high Q output state of flip-flop 28. The output circuit of the gate 30 is connected to an input of a programmable counter 34 which counts a predetermined number of input pulses to reset the flip-flop 28. The programmable counter 34 is so conditioned by means of a circuit designated by numeral 36 as to count as many discharge pulses to be applied to the photodetector 10 as necessary depending on the scanning frequency selected.

Assume that the system is capable of transmitting signals at one of a plurality of selectable transmission speeds which correspond to line scanning frequencies F1, F2, . . . Fn where Fn is the maximum frequency. Each line path of document is transmitted at one of intervals T1, T2 . . . Tn which correspond to the cycle period of the frequencies F1, F2 . . . Fn, respectively. Therefore, Tn is the minimum transmission interval of the system.

Consider now the minimum time interval necessary for the photodetector 10 to produce a video output of acceptable amplitude level, and let us designate this minimum interval $T_{min}$. This minimum interval $T_{min}$ may be equal to or smaller than the transmission interval Tn of the system and the following relation can hold:

$$T_{min} = [N/(M+N)] \times Tn \quad (1)$$

where, M is an integer including zero and N is an integer at least unity.

Let Fcm to denote a frequency which is a common multiple of the frequencies F1, F2 . . . Fn, and let Fi to denote any one of the frequencies F1 through Fn. In the present invention, Fcm is equal to the frequency at which the photodetector 10 is discharged, i.e. discharge clock rate is equal to Fcm.

Therefore, the number of discharging operations that is required of the photodetector 10 before it starts to generate video signals is determined by the following Equation:

$$K = \frac{Fcm}{Fi} - \frac{N}{M+N} \times \frac{Fcm}{Fn} \quad (2)$$

For purposes of illustration, the system is assumed to have 3 Hz and 5 Hz scanning frequency modes so that Fcm is at 15 Hz, i.e. the discharge clock rate is at 15 Hz. Assume, for the sake of simplicity, that M=0, and that the system is operating in the 3 Hz mode, it will be appreciated that the photodetector 10 is discharged "twice" by the output from the gate 30.

The circuit 36 determines the K value that is used to program the counter 34 so that "two" discharge clock pulses may be passed through the gate 30 to the photodetector 10. The circuit 36 is shown as comprising a division circuit 44 which performs division of an electrical value representing the frequency Fcm by another electrical value representing a selected frequency Fi. A second division circuit 46 provides division of an electrical quantity representing Fcm by another quantity representing Fn. The output of the division circuit 46 is multiplied in a multiplier 48 by a quantity representing N/(M+N) provided from a source 50. The output from the multiplier 48 is used to subtract from the output of the division circuit 44 by means of a subtractor 52 to generate a subtraction output which corresponds to the K value of Equation (2).

The programmable counter 34 is thus instructed to count two discharge pulses supplied from the output of gate 30 and reset the flip-flop 28 to terminate the supply of discharge clock to the photodetector 10 (see FIGS. 2I, 2J and 2K).

In response to the absence of synchronization pulses, gates 38 and 40 are activated to pass transmission clock pulses to the shift register 24 via OR gate 26 and clock out the video information now stored in the shift register via gate 40 to a utilization circuit (not shown) where the video signal will be processed into a form suitable for transmission.

If the system is switched to the 5 Hz scanning mode, the programming circuit 36 generates a signal which instructs the counter 34 to immediately reset the flip-flop 28 and inhibit it from being set in response to the output from the 2,048-bit counter 20. Therefore, no discharging operations occur. With the system being switched to the 5 Hz mode, the timing signal will be so automatically adjusted that the synchronization pulses occur at intervals smaller than for the 3 Hz mode. The photodetector 10 thus operates to accumulate charge in response to each synchronization pulse.

What is claimed is:

1. A variable speed facsimile transmitter including means for generating synchronization pulses at one of a plurality of manually selectable rates, a storage mode photodetection array and means for driving said photodetection array in response to each of said sync pulses, comprising means for discharging said photodetection array at an instant delayed from the time of occurrence of the sync pulse by an interval in dependence on the difference between the selected synchronization rate and the highest one of the sync rates so that said photodetection array is allowed to develop charges during a constant interval regardless of the sync rate so selected.

2. A variable speed facsimile transmitter as claimed in claim 1, wherein said time interval is an integral multiple of the reciprocal of a common multiple of said sync rates.

3. A variable speed facsimile transmitter as claimed in claim 2, wherein said common multiple is the least common multiple of said sync rates.

4. A variable speed facsimile transmitter as claimed in claim 2, wherein said discharging means comprises means for generating clock pulses at a rate equal to a common multiple of said synchronization rates, means for counting said clock pulses to provide an output upon a count predetermined by said difference in sync rate, and means for applying said clock pulses to said photodetection array to discharge same for an interval from the occurrence of the sync pulse to the occurrence of said output from the counting means.

5. A variable speed facsimile transmitter as claimed in claim 4, wherein said counting means comprises a programmable counter.

6. A variable speed facsimile transmitter as claimed in claim 1, wherein said discharging means includes means for allowing said photodetection array to charge electrical energy selectively in response to said instant of discharge when said selected sync rate is other than said highest sync rate, or in response to the time of occurrence of the sync pulse when said highest sync rate is selected.

7. A method for operating a variable speed facsimile transmitter having a plurality of selectable line scanning frequencies to provide different transmission speeds and a storage mode photodetection array adapted to generate a video line signal, comprising the steps of:
   (a) generating sync pulses at a frequency corresponding to a selected one of said scanning frequencies;
   (b) determining the difference between the period of the selected frequency and the period of the highest one of said scanning frequencies;
   (c) causing said photodetection array to discharge its stored electrical energy at an instant delayed from the time of occurrence of the sync pulse by an interval determined by said difference in period of said scanning frequencies when the selected frequency is other than highest frequency;
   (d) allowing said photodetection array to charge electrical energy in response to the end of said time interval when the selected frequency is other than said highest frequency, or allowing said photodetection array to charge electrical energy in response to said sync pulse when said highest frequency is selected; and
   (e) driving said photodetection array to generate said video line signal in response to each of said sync pulses.

8. A method as claimed in claim 7, wherein said interval is an integral multiple of a reciprocal of a common multiple of said scanning frequencies.

9. A method as claimed in claim 7, wherein the discharging step comprises discharging said photodetection array one or more times at a frequency equal to a common multiple of said scanning frequencies.

10. A method as claimed in claim 9, wherein said common multiple is the least common multiple of said scanning frequencies.

11. A method of operating a variable speed facsimile transmitter having a storage mode photodetection array and means for driving said array at one of a plurality of selectable line scanning frequencies $F_1, F_2, \ldots F_n$ where $F_n$ is the highest frequency, comprising:
   dividing a time interval $T_L$ which corresponds to the reciprocal of said highest frequency $F_n$ into $(M+N)$ equal time segments, where M is an integer inclusive of zero and N is an integer exclusive of zero;
   multiplying said interval $T_L$ by $N/(M+N)$ to derive a minimum time interval $T_{min}$ necessary to obtain a video signal of an acceptable signal level;
   dividing a time interval $T_i$ which corresponds to the reciprocal of a selected line scanning frequency into a first section in which said photodetection array is prevented from deriving said video signal and a second section equal to said minimum time interval $T_{min}$;
   determining the first section by counting a unit time interval equal to a common multiple of said scanning frequencies a number of times equal to $$(F_{cm}/F_i - \frac{N}{N+M} \times F_{cm}/F_n)$$

where $F_{cm}$ is said common multiple, and $F_i$ is the selected frequency; and
   allowing said photodetection array to develop charges during said minimum time interval $T_{min}$ to derive said video signal at the end of said minimum time interval.

12. A method as claimed in claim 11, wherein said common multiple is the least common multiple of said scanning frequencies.

* * * * *

UNITED STATES PATENT OFFICE
CERTIFICATE OF CORRECTION

Patent No. 4,159,488     Dated June 26, 1979

Inventor(s) Yutaka Tanaka et al.

It is certified that error appears in the above-identified patent and that said Letters Patent are hereby corrected as shown below:

In the drawings, sheet 1, Figure 1, a line should be inserted to connect comparator 22 and shift register 24.

Signed and Sealed this

Fourth Day of December 1979

[SEAL]

Attest:

Attesting Officer

SIDNEY A. DIAMOND

Commissioner of Patents and Trademarks